United States Patent
Moriizumi et al.

(10) Patent No.: US 10,614,189 B2
(45) Date of Patent: Apr. 7, 2020

(54) COMPONENT RETRIEVE DEVICE AND COMPONENT RETRIEVE METHOD

(71) Applicant: FUJITSU LIMITED, Kawasaki-shi, Kanagawa (JP)

(72) Inventors: Kiyokazu Moriizumi, Kawasaki (JP); Yuji Maeda, Kawasaki (JP); Hajime Kubota, Kawasaki (JP); Masayuki Itoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 15/967,620

(22) Filed: May 1, 2018

(65) Prior Publication Data

US 2018/0330035 A1 Nov. 15, 2018

(30) Foreign Application Priority Data

May 15, 2017 (JP) .................................. 2017-096860

(51) Int. Cl.
*G06F 17/50* (2006.01)
*G06N 99/00* (2019.01)
*G06F 16/2457* (2019.01)
*G06N 20/00* (2019.01)

(52) U.S. Cl.
CPC .... *G06F 17/5072* (2013.01); *G06F 16/24575* (2019.01); *G06F 2217/02* (2013.01); *G06F 2217/04* (2013.01); *G06N 20/00* (2019.01)

(58) Field of Classification Search
CPC ............. G06F 17/5072; G06F 2217/02; G06F 2217/04; G06N 20/00; G06N 99/005
USPC .................................................. 716/104, 119
See application file for complete search history.

(56) References Cited

U.S. PATENT DOCUMENTS

| | | | |
|---|---|---|---|
| 6,014,672 A * | 1/2000 | Satoh et al. | G06F 16/3349 |
| 6,289,254 B1 * | 9/2001 | Shimizu et al. | G06F 17/50 700/182 |
| 7,712,058 B2 * | 5/2010 | Brathwaite et al. | G06F 17/50 716/106 |
| 8,554,867 B1 * | 10/2013 | Mueller et al. | G06F 16/183 709/213 |
| 2009/0125507 A1 * | 5/2009 | Shiihara et al. | G06F 17/5045 |

FOREIGN PATENT DOCUMENTS

JP  2005-38129   2/2005
JP  2009-122718  6/2009

* cited by examiner

*Primary Examiner* — Sun J Lin
(74) *Attorney, Agent, or Firm* — Fujitsu Patent Center

(57) ABSTRACT

Enclosed herein is a component retrieve device including a memory, and a processor coupled to the memory and configured to receive information for specifying a retrieval target component, refer to a retrieval history of a retrieving person who has retrieved the retrieval target component, specify components similar to the retrieval target component, and output information of the specified components.

17 Claims, 14 Drawing Sheets

| PROPERTY | MANUFAC-TURER | FREQUENCY | STABILITY | PACKAGE | PIN | ... | SUB-STITUTE |
|---|---|---|---|---|---|---|---|
| ABCD1234 | XYZ COMPANY | 25Mhz | ±50ppm | CEREMIC | 25 PIN | | IJKL9000 |
| EFGH5678 | | | | | | | |
| | | | | | | | |

| RETRIEVAL DATE/ MONTH/YEAR | RETRIEVING PERSON | RETRIEVED COMPONENT | RETRIEVING PERSON'S DEPARTMENT | MANUFACTURED EQUIPMENT | ... | ADOPTED COM-PONENT |
|---|---|---|---|---|---|---|
| 2016/3/1 | AAA1 | abc12 | AAA DEPARTMENT | LAPTOP COMPUTER | | ABCD1234 |
| ... | | | | | | |
| 2016/4/2 | BBB2 | ABC123 | BBB DEPARTMENT | SMARTPHONE | | - |
| ... | | | | | | |

FIG. 4

USER ID:AAA1

123

| COMPONENT PROPERTY | COMMENTS | OPEN RANGE | ... |
|---|---|---|---|
| abc12 | - | PRIVATE | |
| def34 | CHANGE INTO JKL AT TIME OF MODIFICATION | WITHIN DEPARTMENT | |
| ghi56 | THERE IS PROBLEM OF CHARACTERISTIC DETERIORATION AT 70°C OR HIGHER | OPEN TO ALL | |
| ... | MOUNTING DIAGRAM A | | |

FIG. 5

RETRIEVING PERSON:AAA1

COMPONENT PROPERTY 9001

ABC123

RETRIEVAL PURPOSE 9002

Default ▼

NEW DESIGN
EOL SUBSTITUTE

COMPONENT DETAILS 9101

| COMPONENT PROPERTY | ABC123 |
|---|---|
| MAKER | XYZ COMPANY |
| CHARAC-TERISTIC | 25MHz |
| ... | |

RECOMMENDED COMPONENT(Default) 9102

| NO. | COMPONENT PROPERTY |
|---|---|
| 1 | ABCD1234 |
| 2 | EFG789 |
| 3 | JJJ765 |
| 4 | NOP777 |
| 5 | KLM333 |
| ... | ... |

FIG. 7

COMPONENT DETAILS 9200 9201

| COMPONENT PROPERTY | ABC123 |
|---|---|
| MAKER | XYZ COMPANY |
| CHARAC-TERISTIC | 25MHz |
| ... | |

RECOMMENDED COMPONENT (NEW DESIGN) 9202

| NO. | COMPONENT PROPERTY |
|---|---|
| 1 | ABCD1234 |
| 2 | JJJ765 |
| 3 | NOP777 |
| 4 | KLM333 |
| 5 | ... |
| ... | |

FIG. 8

COMPONENT DETAILS — 9300, 9301

| COMPONENT PROPERTY | ABC123 |
|---|---|
| MAKER | XYZ COMPANY |
| CHARAC-TERISTIC | 25MHz |
| ... | |

RECOMMENDED COMPONENT (EOL SUBSTITUTE) — 9302

| NO. | COMPONENT PROPERTY |
|---|---|
| 1 | NOP777 |
| 2 | KLM333 |
| 3 | ... |
| 4 | |
| 5 | |
| ... | |

FIG. 9

| COMPONENT DETAILS | 9903 |
|---|---|
| COMPONENT PROPERTY | ghi56 |
| USER | AAA1 |
| RETRIEVAL DATE | 2016/3/13 |
| COMMENTS | THERE IS PROBLEM OF CHARACTERISTIC DETERIORATION AT 70°C OR HIGHER |
| ... | |
| | |
| | |

9900

9904

[ ADOPTION ]  [ RETURN TO LIST ]

FIG. 11

| COMPONENT NAME | NUMBER | PROPERTY, ETC. |
|---|---|---|
| LED | 3 | |
| VARIABLE RESISTANCE | 1 | 10k |
| CONDENSER(PRESSURE RESISTANCE 1000V) | 1 | 0.1u |
| DIODE | 1 | 1N4007 |
| RESISTANCE | 1 | 1k |
| RESISTANCE | 1 | 10k |
| RESISTANCE | 1 | 20k |
| TEST PIN | 3 | |
| PIN SOCKET (FEMALE) | 4 | |
| PIN HEADER (MALE) | 2 | |
| CRYSTAL OSCILATOR | | ABCD1234 |
| IC | | |

COMPONENT RETRIEVE DEVICE AND COMPONENT RETRIEVE METHOD

CROSS-REFERENCE TO RELATED APPLICATION

This application is based upon and claims the benefit of priority of the prior Japanese Patent Application No. 2017-096860, filed on May 15, 2017, the entire contents of which are incorporated herein by reference.

FIELD

The embodiments discussed herein are related to a component retrieve device and a component retrieve method.

BACKGROUND

A technology of retrieving an optimum component, for example, in a case of performing a circuit design has been known. For example, with respect to a CAD system and program, there has been known a technology of performing a circuit design by effectively using data related to the circuit designs registered in the past. In this technology, a recommended circuit for changing a circuit topology of a circuit to be designed is acquired by retrieving or searching a database unit storing component data and circuit data based on a condition for narrowing down input circuits, and a list of recommended circuits is displayed.

Further, there has been known a technology in which when designing a product, useful materials for determination are supplied to a designer so as to support a design of a superior product. This technology uses a component table database for managing information of a product which includes the designing stage as unique component information, and a component evaluation database for managing evaluation information of each component used to make the product. Further, in the technology, a component constitution list of the product is created for each designer in the component table database, and past component evaluation information of each component used to make the product is determined and stored from the unique component information of the component table database and the component evaluation database. Further, in the technology, the past component evaluation information is displayed in association with the components in the component composition list created by the designer.

Related techniques are disclosed in, for example, Japanese Laid-Open Patent Publication Nos. 2009-122718 and 2005-038129.

SUMMARY

According to an aspect of the invention, a component retrieve device includes a memory, and a processor coupled to the memory and the processor configured to receive information for specifying a retrieval target component, refer to a retrieval history of a retrieving person who has retrieved the retrieval target component, specify components similar to the retrieval target component, and output information of specified components similar to the retrieval target component.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a view illustrating an example of a component database (DB) according to First Embodiment;

FIG. 3 is a view illustrating an example of a retrieval history DB according to First Embodiment;

FIG. 4 is a view illustrating an example of a component list DB according to First Embodiment;

FIG. 5 is a view illustrating an example of an input screen according to First Embodiment;

FIG. 6 is a view illustrating an example of an output result according to First Embodiment;

FIG. 7 is a view illustrating another example of the output result according to First Embodiment;

FIG. 8 is a view illustrating another example of the output result according to First Embodiment;

FIG. 9 is a view illustrating an example of a detail screen according to First Embodiment;

FIG. 11 is a view illustrating an example of a component table;

DESCRIPTION OF EMBODIMENTS

The trend of a component optimal at a given time such as the shape and cost rapidly changes, and an amount of information is enormous. Thus, it is difficult for a designer to grasp the trend of all components used for a design and adopt an optimal component suitable for the trend. Further, even though some designers have obtained optimal information, the information may not be shared with other fields and, thus, may not be utilized.

Hereinafter, embodiments of a technology capable of providing a useful retrieval result of a component retrieval will be described in detail based on the accompanying drawings. The present disclosure is not limited to the embodiments. In addition, the embodiments may be appropriately combined with each other within the scope that does not cause any inconsistency.

First Embodiment

Figure 1:
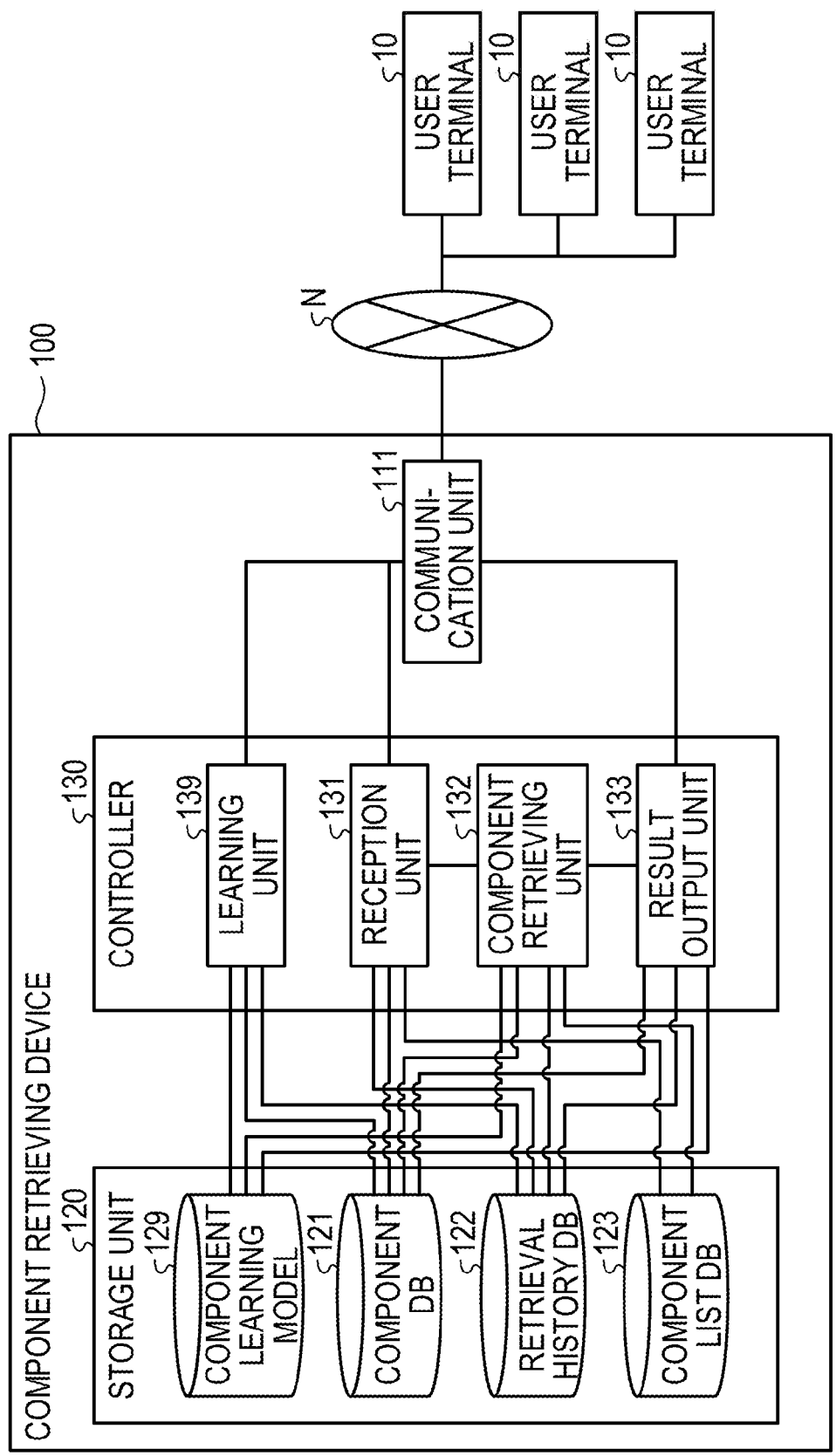
FIG. 1 is a diagram illustrating an example of a component retrieving device according to First Embodiment.

A component retrieving device according to the present embodiment will be described using FIG. 1. FIG. 1 is a diagram illustrating an example of a component retrieving device according to First Embodiment. As illustrated in FIG. 1, a component retrieving system 1 includes a component retrieving device 100 and a plurality of user terminals 10. In the present embodiment, the component retrieving device 100 and the user terminals 10 are connected to each other so as to communicate with each other via a wireless or wired network N. In addition, in FIG. 1, the number of the user terminals 10 is merely an example, and the component retrieving system 1 may be configured to include an arbitrary number of user terminals 10.

Each user terminal 10 illustrated in FIG. 1 is used by, for example, a circuit designer. The circuit designer transmits information on a component desired to be retrieved, to the component retrieving device 100 through the user terminal 10.

The component retrieving device 100 illustrated in FIG. 1 receives the information on the component desired to be retrieved, from the user terminal 10, and extracts and outputs components matching the condition. The component retrieving device 100 according to the present embodiment extracts information of other similar components retrieved or adopted by the user who retrieved the retrieval target component in the past, by using a model that has learned, for example, a history of component retrieval or component adoption of each user, so that a useful retrieval result may be provided.

[Functional Blocks]

Next, a functional configuration of the component retrieving device 100 according to the present embodiment will be described using FIG. 1. The component retrieving device 100 includes a communication unit 111, a storage unit 120, and a controller 130.

The communication unit 111 controls a wired or wireless communication with other computers such as the user terminal 10. The communication unit 111 is, for example, a communication interface such as a network interface card (NIC).

The storage unit 120 stores, for example, various data such as programs executed by the controller 130. Further, the storage unit 120 includes a component DB 121, a retrieval history DB 122, a component list DB 123, and a learning model 129. The storage unit 120 corresponds to a semiconductor memory device such as a random access memory (RAM), a read only memory (ROM) or a flash memory, or a storage device such as a hard disk drive (HDD).

The component DB 121 stores information on components. FIG. 2 is a view illustrating an example of the component DB according to First Embodiment. As illustrated in FIG. 2, the component DB 121 stores, for example, "Property," "Manufacturer," "Frequency," "Stability," "Package," "Pin," and "Substitute" with association with each other. In the present embodiment, the component DB 121 stores one record for each component. In addition, the information stored in the component DB 121 is input by, for example, a reception unit 131 to be described later.

In FIG. 2, the "Property" stores a property uniquely attached to a component.

As illustrated in FIG. 2, the component DB 121 stores, for example, "Property," and "Manufacturer" of each component. Further, the component DB 121 stores, for example, characteristics or specifications of each component such as "Frequency," "Stability," "Package," and "Pin." In FIG. 2, the item of "Substitute" stores information specifying a substitute registered for the corresponding component. In addition, the information stored in the component DB 121 is merely an example, and the component DB 121 may be configured to further store other information such as an external dimension or may be configured not to store a part of the information illustrated in FIG. 2. In addition, some items of the records may be blank, for example, as in a case where no substitute has been registered.

Referring back to FIG. 1, with respect to the component retrieval performed by a user in the past, the retrieval history DB 122 stores information on the component and information on the user who performed the retrieval. FIG. 3 is a view illustrating an example of the retrieval history DB according to First Embodiment. As illustrated in FIG. 3, the retrieval history DB 122 stores "Retrieval Date/Month/Year," "Retrieving Person," "Retrieved Component," "Retrieving Person's Department," "Manufactured Equipment," and "Adopted Component" in association with each other. In the present embodiment, a record is added to the retrieval history DB 122 each time retrieval is performed. In addition, the information stored in the retrieval history DB 122 is input by the reception unit 131 and a component retrieving unit 132 which will be described later.

In FIG. 3, the "Retrieval Date/Month/Year" and "Retrieving Person" store date/month/year on which the retrieval is performed and the user who performs the retrieval, respectively. The "Retrieved Component" stores a retrieval target component in the retrieval. The "Retrieving Person's Department" and the "Manufactured Equipment" store a department to which the retrieving person belongs and information on manufactured equipment. The "Adopted Component" stores, for example, a property specifying a component adopted by the retrieving person in the retrieval. In addition, the information stored in the retrieval history DB 122 is merely an example, and the retrieval history DB 122 may be configured to further store other information such as a retrieval purpose designated by the user or may be configured not to store a part of the information illustrated in FIG. 3. In addition, some items of the records may be blank, for example, as in a case where the retrieval is performed but no component is adopted.

Referring back to FIG. 1, the component list DB 123 stores information related to a component retrieved by the user. FIG. 4 is a view illustrating an example of the component list DB according to First Embodiment. As illustrated in FIG. 4, the component list DB 123 stores, for example, "Comments" and "Open Range" in association with "Component Property." The component list DB 123 stores, for example, one table for each user. In addition, the information stored in the component list DB 123 is input by, for example, the reception unit 131 to be described later. In addition, the information stored in the component list DB 123 is merely an example, and the component list DB 121 may be configured to further store other information or may be configured not to store a part of the information illustrated in FIG. 4.

In FIG. 4, the "Comments" store comments input by the user for the corresponding component. The "Open Range" indicates a permitted range of the comments which is permitted by the user. For example, when the open range of the comments is "within department," the comments are disclosed only to users belonging to the same department as that of the corresponding user. When the open range of the comments is "open to all," the comments are disclosed to all users, irrespective of the departments to which the users belong. In addition, when the open range of the comments is "private," the comments are not disclosed to any other users than the corresponding user.

Referring back to FIG. 1, the learning model 129 stores a model for specifying a component similar to the retrieval target component. The learning model 129 is generated by, for example, well-known machine learning using items on mounting environments of each component such as a mounting place, a use environment, and a voltage. In addition, the learning model 129 may be generated by using items such as a department to which the user retrieving a component belongs, manufactured equipment, and past retrieval history. In addition, the learning model 129 is registered or updated by, for example, a learning unit 139 to be described later. In addition, the learning model 129 may be configured such that an initial value is registered by, for example, a technician or may be configured to be updated by, for example, a technician.

Next, the controller 130 is a processor responsible for the overall processes of the component retrieving device 100. The controller 130 is implemented when programs stored in an internal storage device are executed by, for example, a central processing unit (CPU) or a micro processing unit (MPU) using a RAM as a work area. In addition, the controller 130 may be implemented by, for example, an integrated circuit such as an application specific integrated circuit (ASIC) or a field programmable gate array (FPGA).

The controller 130 includes the reception unit 131, the component retrieving unit 132, a result output unit 133, and the learning unit 139. The reception unit 131, the component retrieving unit 132, the result output unit 133, and the learning unit 139 are examples of electronic circuits included in the processor or examples of processes executed by the processor.

The reception unit 131 receives information on the retrieval target component and information on the component which is input by the user. When receiving the input of the information on the retrieval target component, the reception unit 131 causes the user terminal 10 to display an input screen as illustrated in FIG. 5 through, for example, the communication section 111.

FIG. 5 is a view illustrating an example of the input screen according to First Embodiment. As illustrated in FIG. 5, an input screen 9000 includes a text box 9001 for inputting a component property specifying the retrieval target component, and a pull-down menu 9002 for selecting the retrieval purpose.

In the present embodiment, the search purpose indicates a condition for narrowing down retrieved components similar to each other according to the user's purpose of using the retrieved component, and includes, for example, the setting of "default," "new design," and "end of life (EOL) substitute."

In the present embodiment, the "default" indicates a case where the user does not specify the retrieval purpose. In this case, the retrieved similar components are not narrowed down. In addition, the "new design" indicates a condition for narrowing down the similar components retrieved by the user to components corresponding to the user's tendency based on, for example, the user's past retrieval history, and presenting the narrowed-down components, when the retrieved similar components are used for new design. In addition, the "EOL substitute" indicates a condition for narrowing down the retrieved similar components to components compatible with the retrieval target component, when the user retrieves a substitute of an EOL component. In addition, the conditions and processes for narrowing down the retrieved similar components will be described later.

Upon receiving the information specifying the retrieval target component and the information specifying the retrieval purpose which are input or selected on the input screen illustrated in FIG. 5, from the user terminal 10 through the communication unit 111, the reception unit 131 registers the received information in the component DB 121, and simultaneously, outputs the information to the component retrieving unit 132.

Further, the reception unit 131 receives information related to the component from the user terminal 10 through, for example, the communication unit 111. Upon receiving, from the user terminal 10, the information specifying the component, the comments on the component, and the information specifying the open range of the comment which are input by the user, the reception unit 131 stores the received information in the corresponding table of the user in the component list DB 123.

Next, the component retrieving unit 132 retrieves components similar to the retrieval target component. Upon receiving the input of the information on the retrieval target component from the reception unit 131, first, the component retrieving unit 132 refers to the component DB 121 and extracts information on the details of the retrieval target component. Further, the component retrieving unit 132 refers to, for example, the component DB 121, the retrieval history DB 122, and the learning model 129, and extracts information on components similar to the component of which input has been received.

The component retrieving unit 132 refers to, for example, the retrieval history DB 122 and specifies the user who retrieves the retrieval target component. Then, the component retrieving unit 132 specifies components which were retrieved by the specified user in the past, as the components similar to the retrieval target component. In addition, the component retrieving unit 132 may specify the components similar to the component of which input has been received, by the machine learning with reference to, for example, the component DB 121, the retrieving history DB 122, and the learning model 129. Then, the component retrieving unit 132 outputs the information on the specified similar components to the result output unit 133. In addition, when no similar component is retrieved, the component retrieving unit 132 outputs information indicating that no similar component is retrieved, to the result output unit 133. In addition, the component retrieving unit 132 is an example of a specifying unit.

In addition, when the similar components are retrieved, the component retrieving unit 132 refers to the component list DB 123 and determines whether there exists information such as comments which has been registered with regard to the similar comments. When it is determined that there exists information registered with regard to the similar components, the component retrieving unit 132 extracts the information such as comments from the component list DB 123 and outputs the information to the result output unit 133 in association with the information of the similar components.

Next, the result output unit 133 outputs the information on the result of the component retrieval to the user terminal 10. The result output unit 133 generates the information to be transmitted to the user terminal 10 by using the information on the similar components or the information indicating that no similar component is retrieved, which is input from the component retrieving unit 132, and transmits the generated information to the user terminal 10 through the communication unit 111. In addition, the result output unit 133 is an example of an output unit.

In addition, when the retrieval purpose is set, the result output unit 133 outputs a result obtained by narrowing down the retrieved similar components according to the set retrieval purpose, to the user terminal 10. For example, when the retrieval purpose is "Default," the result output unit 133 outputs the information on the retrieved similar components to the user terminal 10 without narrowing down the retrieved similar components.

Meanwhile, when the retrieval purpose is "new design," the result output unit 133 refers to the retrieval history DB 122 and narrows down the retrieved similar components to components similar to the components retrieved by the user in the past. The result output unit 133 takes, for example, components which were adopted as a retrieval result by the user in the past, as the components to which the retrieved similar components are narrowed down. In addition, the result output unit 133 may specify the components to which the retrieved similar components are narrowed down, by the machine learning with reference to, for example, the component DB 121, the retrieval history DB 122, and the learning model 129.

In addition, when the retrieval purpose is "EOL substitute," the result output unit 133 refers to the component DB 121 and narrows down the retrieved similar components to components pin-compatible or package-compatible with the retrieval target component.

Various output screens output by the result output unit 133 will be described with reference to FIGS. 6 to 9. FIG. 6 is a view illustrating an example of the output result according to First Embodiment. FIG. 6 illustrates an output result screen 9100 in a case where the "Default" setting is selected. As illustrated in FIG. 6, the output result screen 9100 displays a table 9101 representing the information on the details of the retrieval target component and a list 9102 of components recommended as the components similar to the retrieval target component. In FIG. 6, since the "Default" setting is selected, the list 9102 displays all of the retrieved similar components without narrowing down the retrieved similar components.

Next, FIG. 7 is a view illustrating another example of the output result according to First Embodiment. FIG. 7 illustrates an output result screen 9200 in a case where the "new design" setting is selected. As illustrated in FIG. 7, the output result screen 9200 displays a table 9201 representing the information on the details of the retrieval target component, as in the output result screen 9100. Meanwhile, a recommended component list 9202 which is included in the output result screen 9200 displays a result obtained by narrowing down the retrieved similar components to components similar to the components retrieved by the user in the past. As illustrated in FIG. 7, in the list 9202, the retrieved similar components are narrowed down so as not to include "EFG 789" included in the list 9102.

Next, FIG. 8 is a view illustrating another example of the output result according to First Embodiment. FIG. 8 illustrates an output result screen 9300 in a case where "EOL substitute" is selected. As illustrated in FIG. 8, the output result screen 9300 displays a table 9301 representing the information on the details of the retrieval target component, as in the output result screens 9100 and 9200. Meanwhile, a recommended component list 9302 which is included in the output result screen 9300 displays a result obtained by narrowing down the retrieved similar components to components pin-compatible or package-compatible with the retrieval target component. As illustrated in FIG. 8, in the list 9302, the retrieved similar components are narrowed down so as not to include "EFG789," "ABCD1234," and "333765" included in the list 9102.

In addition, when receiving the user's selection of any one of the recommended components in the output results as illustrated in FIGS. 6 to 8, the result output unit 133 outputs detailed information of the selected component. Upon receiving the information specifying the selected component from the user terminal 10 through the communication unit 111, the result output unit 133 refers to the component DB 121 and extracts the detailed information of the component. Then, the result output unit 133 causes a screen including the detailed information of the component to be output to the user terminal 10 through the communication unit 111.

FIG. 9 is a view illustrating an example of a detail screen according to First Embodiment. FIG. 9 illustrates a detail screen 9900 in a case where a recommended component "ghi56" is selected on the output result screen 9100. As illustrated in FIG. 9, the detail screen 9900 includes information 9903 on the component "ghi56." The information 9903 on the component "ghi56" includes, for example, information on the retrieving person and the retrieval date which is extracted from the retrieval history DB 122, in addition to the information on the component which is extracted from the component DB 121. Further, the information 9903 on the component "ghi56" also includes information such as comments which is stored in the component list DB 123. In addition, the detail screen 9900 further includes an adoption button 9904 for receiving an adoption of a component from the user.

In addition, when receiving the user's selection of the adoption button 9904 on the detail screen 9900 illustrated in FIG. 9, the result output unit 133 registers the selected component as an adopted component in the retrieval history DB 122.

Next, the learning unit 139 updates the learning model 129 by using information on a component and information on a use situation of the component. For example, the learning unit 139 receives information on a component and information on a type of the component or information on components similar to the component from the user terminal 10 through the communication unit 111. By using the received information, the learning unit 139 registers or updates the learning model 129 through, for example, a known supervised machine learning technique. For example, the learning unit 139 registers values obtained by weighting, for example, a type, an external dimension, an electrical characteristic, and design manufacturing information of the component, as the learning model 129, or updates the learning model 129.

[Flow of Processes]

Figure 10:
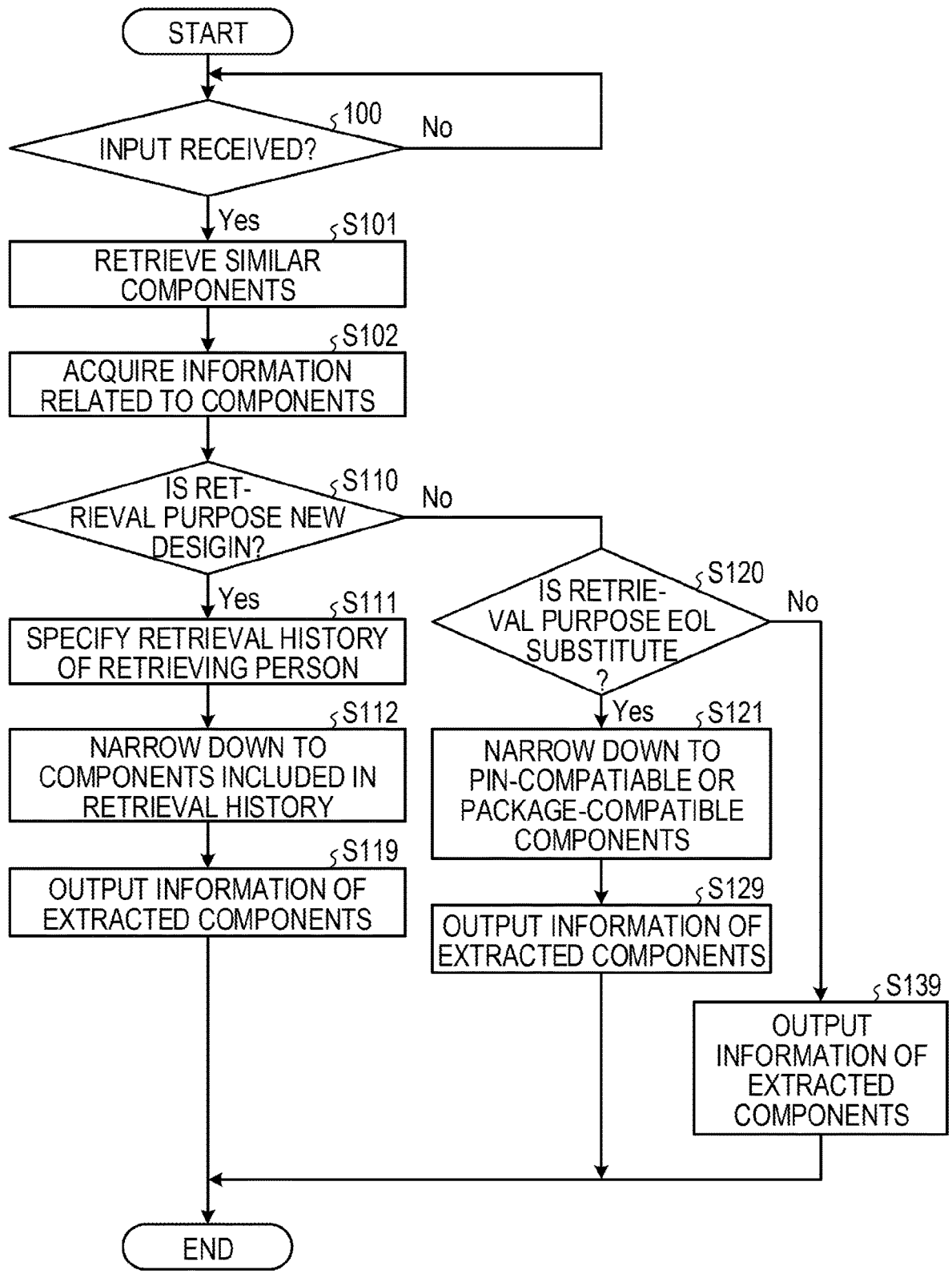
FIG. 10 is a flowchart illustrating an example of a component retrieving process according to First Embodiment.

Next, the processes according to the present embodiment will be described using FIG. 10. FIG. 10 is a flowchart illustrating an example of a component retrieving process according to First Embodiment. As illustrated in FIG. 10, the reception unit 131 of the component retrieving device 100 waits for receiving the information on the retrieval target component from the user terminal 10 through, for example, the communication unit 111 (S100: "No").

When it is determined that the information on the retrieval target component has been received (S100: "Yes"), the reception unit 131 outputs the information on the retrieving person, the information on the retrieval purpose, and the information on the retrieval target component to the component retrieving unit 132, and simultaneously, registers the information in the component DB 121. Next, the component retrieving unit 132 retrieves components similar to the retrieval target component (S101). The component retrieving unit 132 refers to, for example, the retrieval history DB 122 and acquires information on components included in the retrieval history of the user who retrieved the retrieval target component in the past. In addition, the component retrieving unit 132 may refer to the learning model 129 and further narrow down the components similar to the retrieval target component, among the acquired information on the components.

Next, the component retrieving unit 132 refers to the component list DB 123 and acquires the information such as comments which is registered with regard to the retrieved similar components (S102). Then, the component retrieving unit 132 outputs the information on the retrieval purpose, the information on the retrieval target component, the information on the components similar to the received component, and the information extracted from the component list DB 123, to the result output unit 133.

Next, the result output unit 133 determines whether the retrieval purpose is new design (S110). When it is determined that the retrieval purpose is new design (S110: "Yes"), the result output unit 133 refers to the retrieval history DB 122 and specifies the past retrieval history of the retrieving person (S111). Next, the result output unit 133 narrows down the similar components to components included in the past retrieval history of the retrieving person (S112). Then, the result output unit 133 outputs the information on the extracted components to the user terminal 10 through the communication unit 111 (S119), and the process is ended.

Meanwhile, when it is determined that the retrieval purpose is not new design (S110: "No"), the result output unit 133 determines whether the retrieval purpose is the EOL substitute (S120). When it is determined that the retrieval purpose is the EOL substitute (S120: "Yes"), the result output unit 133 refers to the component DB 121 and extracts information on a pin and package of the retrieval target component. Then, the result output unit 133 refers to the component DB 121, and narrows down the similar components to components pin-compatible or package-compatible with the retrieval target component (S121). Then, the result output unit 133 outputs the information on the extracted components to the user terminal 10 through the communication unit 111 (S129), and the process is ended.

Meanwhile, when it is determined that the retrieval purpose is not new design (S120: "No"), the result output unit 133 outputs the information of the extracted components to the user terminal 10 through the communication unit 111 without narrowing down the components (S139), and the process is ended.

[Effects]

As described above, the component retrieving program according to the present embodiment causes a computer to execute the process of receiving the input of the information specifying the retrieval target component by the retrieving person. The component retrieving program according to the present embodiment refers to the past retrieval history of the user who retrieved the retrieval target component in the past and specifies components similar to the specified retrieval target component. Further, the component retrieving program according to the present embodiment outputs the information on the specified similar components. Thus, the useful retrieval result may be provided.

Second Embodiment

While the embodiment of the present disclosure has been described, the present disclosure may be implemented in various different forms, in addition to the embodiment described above. For example, in First Embodiment, when retrieving a component, the property of the component is input. However, the present disclosure is not limited to this configuration. For example, the reception unit 131 may receive input of a condition relating to, for example, the specification of the component, instead of the information such as the property uniquely identifying the component. In this case, the reception unit 131 refers to, for example, the component DB 121 and specifies a component meeting the received condition as the retrieval target component. In addition, on the input screen illustrated in FIG. 5, for example, a pull-down menu for selecting, for example, a property or specification of a component may be displayed, instead of the text box for inputting a property of a component.

In addition, instead of a single component, a plurality of components described in, for example, a component table, a circuit diagram, and a mounting diagram may be collectively retrieved as retrieval target components. FIG. 11 is a view illustrating an example of the component table. For example, FIG. 11 is the component table representing a list of components used for one circuit. The component table illustrated in FIG. 11 includes records in which "Component Name" indicating a name of a component, "Number" indicating the number of components used in a circuit, and "Property, Etc." indicating, for example, a model number, a capacity or a resistance value of a component are associated with each other.

In the present embodiment, when receiving an input of the component table, the component retrieving device 200 extracts, for example, properties described in the component table. Then, the component retrieving device 200 repeats the component retrieving process illustrated in FIG. 10 for each property. In addition, the illustration of the component retrieving device 200 according to the present embodiment is omitted.

Figure 12:
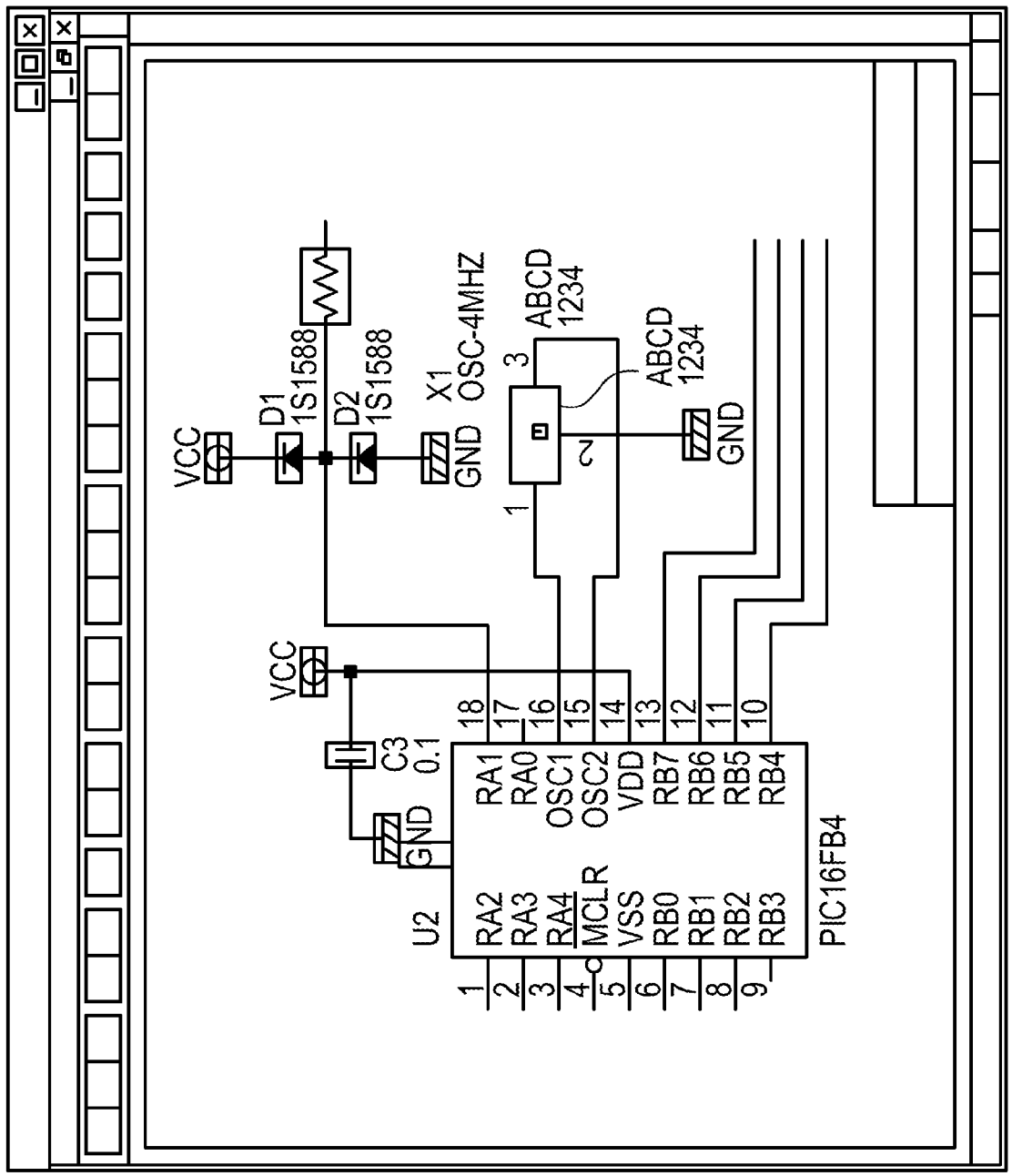
FIG. 12 is a view illustrating an example of a circuit diagram.
Figure 13:
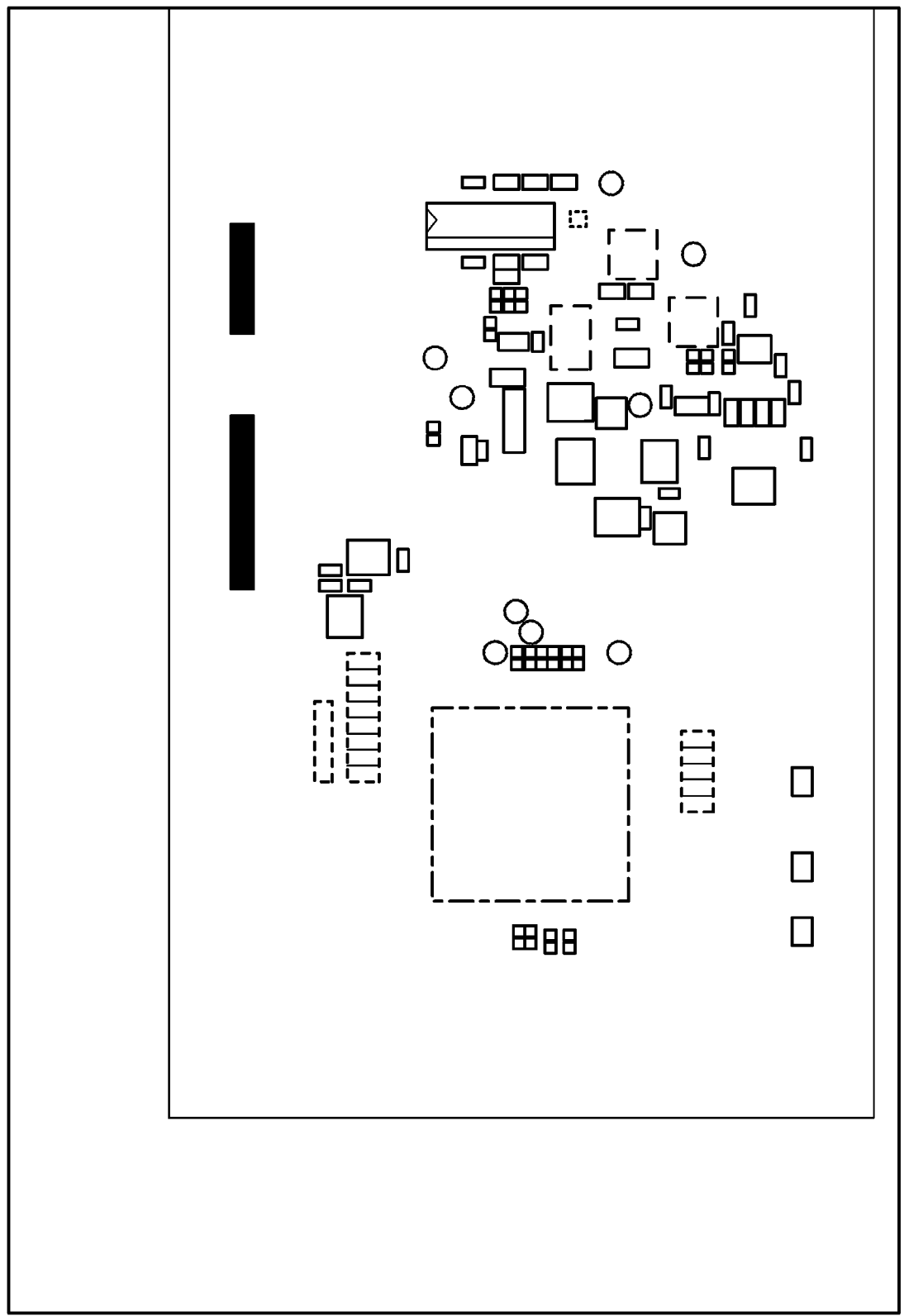
FIG. 13 is a view illustrating an example of a mounting diagram.

In addition, in the component retrieving device 200 according to the present embodiment, an input of the circuit diagram or the mounting diagram may be received, without being limited to the component table. FIG. 12 is a view illustrating an example of the circuit diagram. Further, FIG. 13 is a view illustrating an example of the mounting diagram. For example, upon receiving the input of the circuit diagram illustrated in FIG. 12 or the mounting diagram illustrated in FIG. 13, the component retrieving device 200 of the present embodiment recognizes, for example, properties described in the circuit diagram or the mounting diagram. The component retrieving device 200 receives image data of the circuit diagram or the mounting diagram read by, for example, a scanner (not illustrated), and recognizes, for example, the properties by using a known optical character recognition (OCR) technology. Then, the component retrieving device 200 repeats the component retrieving process illustrated in FIG. 10 for each recognized property.

In this way, the process at the designing time is performed by receiving the input of, for example, the component table, the circuit diagram or the mounting diagram, so that the component retrieving device 200 of the present embodiment may collectively extract information on a plurality of related components which are used at the same time.

In this case, the component retrieving device 200 may refer to the retrieval history DB 122 and specify, for example, a component table, a circuit diagram or a mounting diagram which is similar to, for example, the component table, the circuit diagram or the mounting diagram of which input has been received. Then, the component retrieving device 200 may retrieve components used in the usage situation similar to, for example, that of the specified component table, circuit diagram or mounting diagram, as the similar components. Thus, the similar components may be more comprehensively presented to the user.

Figure 14:
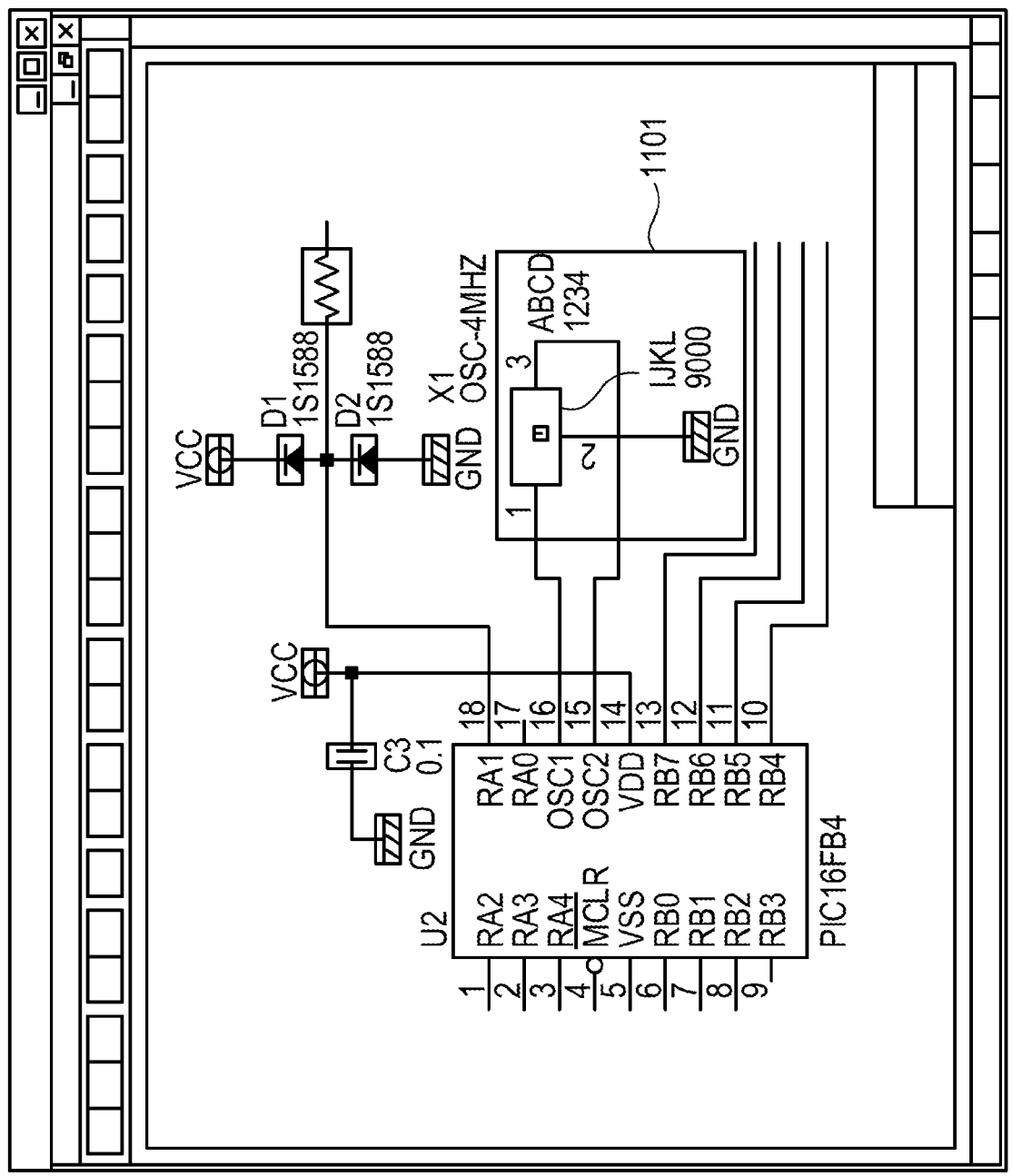
FIG. 14 is a view illustrating an example of a circuit diagram rewritten by substitute information according to Second Embodiment.

In addition, in a case where the input of, for example, the component table, the circuit diagram or the mounting diagram is received, when information on a substitute of a component is presented, the component retrieving device 200 may update, for example, the input component table, circuit diagram or mounting diagram by using the information on the substitute selected by the user. FIG. 14 is a view illustrating an example of a circuit diagram rewritten by the information of the substitute according to Second Embodiment. In the circuit diagram illustrated in FIG. 14, as indicated by the reference numeral 1101, a crystal oscillator "ABCD1234" in the circuit diagram illustrated in FIG. 12 is replaced with a substitute "IJKL9000." Thus, an example of a substitute of a component may be easily presented to the user.

[System]

Among the respective processes described above in the embodiments, all or some of the processes described to be automatically performed may be manually performed. Alternatively, all or some of the processes described to be manually performed may be automatically performed by a known method. In addition, the process procedures, the control procedures, the specific names, and the information including various data or parameters described in the disclosure herein or the drawings may be arbitrarily changed unless otherwise specified.

In addition, each component of the respective illustrated device is functionally conceptual and is not necessarily required to be configured physically as illustrated. That is, specific forms of distribution or integration of the respective devices are not limited to those illustrated. That is, all or some of the devices may be configured to be functionally or physically distributed or integrated in arbitrary units depending on, for example, various loads or use conditions. For example, the component retrieving unit 132 and the result output unit 133 may be integrated with each other. Further, the reception unit 131 illustrated in FIG. 1 may be distributed into a processing unit that receives the retrieval target component and a processing unit that receives a registration of, for example, the user's comments on a component. In addition, all or some of the respective process functions executed in the respective devices may be implemented by a CPU and programs analyzed and executed in the CPU, or hardware by a wired logic.

[Component Retrieving Program]

Figure 15:
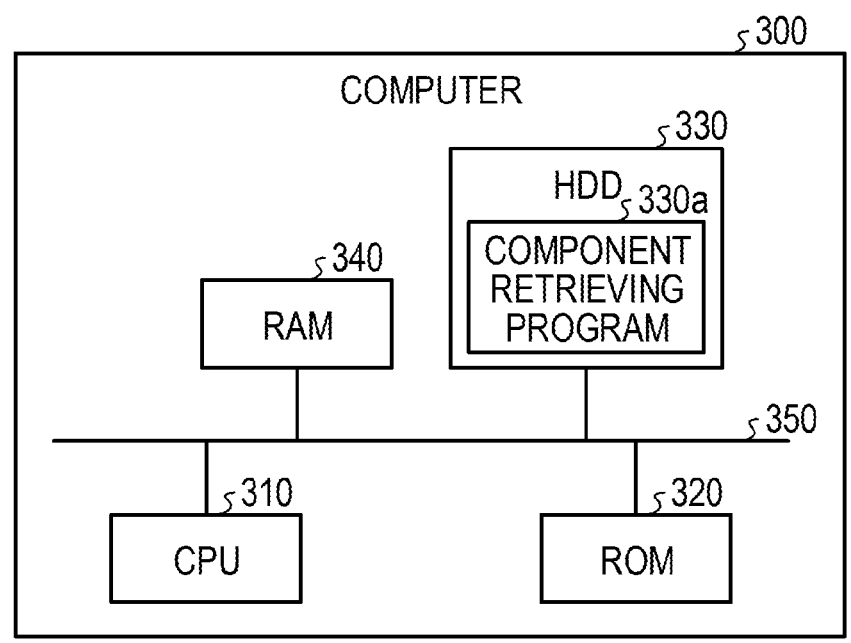
FIG. 15 is a view illustrating a computer that executes a component retrieving program.

The various processes of the component retrieving devices 100 and 200 described in the embodiments above may be implemented by causing prepared programs to be executed by a computer system such as a personal computer or a workstation. Thus, hereinafter, descriptions will be made on an example of a computer that implements the same functions as those of the component retrieving devices 100 and 200 described in the embodiments above, with reference to FIG. 15. FIG. 15 is a view illustrating a computer that executes the component retrieving program.

As illustrated in FIG. 15, a computer 300 includes a CPU 310, a ROM 320, an HDD 330, and a RAM 340. These devices 310 to 340 are connected to each other via a bus 350.

The ROM 320 stores a basic program such as an operating system (OS). In the HDD 330, a component retrieving program 330a that exhibits the same functions as the reception unit 131, the component retrieving unit 132, the result output unit 133, and the learning unit 139 illustrated in First Embodiment above is stored in advance. In addition, the component retrieving program 330a may be appropriately separated. Further, various data and tables stored in the storage unit 120 are installed in the HDD 330.

The CPU 310 reads out the component retrieving program 330a from the HDD 330 and executes the component retrieving program 330a.

Then, the CPU 310 reads out various data and tables, and stores the data and tables in the RAM 340. Further, the CPU 310 executes the component retrieving program 330a by using the various data and tables stored in the RAM 340. In addition, all of the data stored in the RAM 340 may not be stored in the RAM 340 at all times. The data to be used only for the processes may be stored in the RAM 340.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A component retrieve device comprising:
 a memory: and
 a processor coupled to the memory and configured to:
 receive information for specifying a retrieval target component and information of a plurality of retrieving persons;
 refer to a retrieval history of a retrieving person who has retrieved the retrieval target component;
 specify components similar to the retrieval target component, based on a machine learning using at least a retrieval history of a specified retrieving person of the plurality of retrieving persons and a retrieval history of another retrieving person of the plurality of retrieving persons; and
 output information of the specified components.

2. The component retrieve device according to claim 1, wherein the processor is further configured to:
 receive information for indicating that the retrieval target component is a component at a time of a new design; and
 specify preferentially, among components similar to the retrieval target component, the components included in the retrieval history of a specified retrieving person and the components similar to the retrieval target component, based on a machine learning.

3. The component retrieve device according to claim 1, wherein the processor is further configured to:
 receive information for indicating that the retrieval target component is a substitute of an end of life (EOL) component; and
 specify preferentially, among components similar to the retrieval target component, the components common in a pin or package with the retrieval target component.

4. The component retrieve device according to claim 1, wherein upon receiving information of a component table, a circuit diagram or a mounting diagram, each component specified from the component table, the circuit diagram or the mounting diagram is specified as the retrieval target component.

5. The component retrieve device according to claim 1, the processor is further configured to:
 output information of a substitute of the specified components similar to the retrieval target component; and upon receiving information of a component table, a circuit diagram or a mounting diagram, and upon receiving the information of the substitute of the specified components, update the component table, the circuit diagram or the mounting diagram by using the information of the substitute of the specified components.

6. A computer-readable non-transitory recording medium storing a program that causes a computer to execute a procedure, the procedure comprising:
receiving information for specifying a retrieval target component and information of a plurality of retrieving persons;
referring to a retrieval history of a retrieving person who has retrieved the retrieval target component;
specifying components similar to the retrieval target component, based on a machine learning using at least a retrieval history of a specified retrieving person of the plurality of retrieving persons and a retrieval history of another retrieving person of the plurality of retrieving persons; and
outputting information of the specified components.

7. The computer-readable non-transitory recording medium according to claim 6, the procedure further comprising:
receiving information for indicating that the retrieval target component is a component at a time of a new design; and
specifying preferentially, among components similar to the retrieval target component, the components included in the retrieval history of a specified retrieving person and the components similar to the retrieval target component, based on a machine learning.

8. The computer-readable non-transitory recording medium according to claim 6, the procedure further comprising:
receiving information for indicating that the retrieval target component is a substitute of an end of life (EOL) component; and
specifying preferentially, among components similar to the retrieval target component, the components common in a pin or package with the retrieval target component.

9. The computer-readable non-transitory recording medium according to claim 6, the procedure further comprising:
outputting at least one of information of specified components similar to the retrieval target component, the retrieving person who has retrieved the retrieval target component, the retrieval history of the retrieving person, a component list created by the retrieving person, and input by the retrieving person.

10. The computer-readable non-transitory recording medium according to claim 6, wherein upon receiving information of a component table, a circuit diagram or a mounting diagram, each component specified from the component table, the circuit diagram or the mounting diagram is specified as the retrieval target component.

11. The computer-readable non-transitory recording medium according to claim 6, the procedure further comprising:
outputting information of a substitute of the specified components similar to the retrieval target component; and
upon receiving information of a component table, a circuit diagram or a mounting diagram, and upon receiving the information of the substitute of the specified components, updating the component table, the circuit diagram or the mounting diagram by using the information of the substitute of the specified components.

12. The computer-readable non-transitory recording medium according to claim 6, wherein the components similar to the retrieval target component are specified among components retrieved by the retrieving person.

13. A component retrieve method comprising:
receiving information for specifying a retrieval target component and information of a plurality of retrieving persons;
referring to a retrieval history of a retrieving person who has retrieved the retrieval target component;
specifying components similar to the retrieval target component, based on a machine learning using at least a retrieval history of a specified retrieving person of the plurality of retrieving persons and a retrieval history of another retrieving person of the plurality of retrieving persons; and
outputting information of the specified components, by a processor.

14. The component retrieve method according to claim 13, further comprising:
receiving information for indicating that the retrieval target component is a component at a time of a new design; and
specifying preferentially, among components similar to the retrieval target component, the components included in the retrieval history of a specified retrieving person and the components similar to the retrieval target component, based on a machine learning.

15. The component retrieve method according to claim 13, further comprising:
receiving information for indicating that the retrieval target component is a substitute of an end of life (EOL) component; and
specifying preferentially, among components similar to the retrieval target component, the components common in a pin or package with the retrieval target component.

16. The component retrieve method according to claim 13, wherein upon receiving information of a component table, a circuit diagram or a mounting diagram, each component specified from the component table, the circuit diagram or the mounting diagram is specified as the retrieval target component.

17. The component retrieve method according to claim 13, further comprising:
outputting information of a substitute of the specified components similar to the retrieval target component; and
upon receiving information of a component table, a circuit diagram or a mounting diagram, and upon receiving the information of the substitute of the specified components, updating the component table, the circuit diagram or the mounting diagram by using the information of the substitute of the specified components.

* * * * *